United States Patent
Leifeld et al.

(10) Patent No.: US 10,968,295 B2
(45) Date of Patent: Apr. 6, 2021

(54) ACRYLIC ACID POLYMERS NEUTRALIZED WITH SODIUM AND CALCIUM IONS AND HAVING A NARROW MOLECULAR WEIGHT DISTRIBUTION

(71) Applicant: BASF SE, Ludwigshafen (DE)

(72) Inventors: Ferdinand Leifeld, Ludwigshafen (DE); Achim Fessenbecker, Ludwigshafen (DE); Steffen Henkes, Ludwigshafen (DE); Massimiliano Bordignon, Ludwigshafen (DE); Vandana Kurkal-Siebert, Ludwigshafen (DE); Laszlo Szarvas, Hong Kong (HK); Qing Feng Tong, Shanghai (CN)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/344,381

(22) PCT Filed: Oct. 24, 2017

(86) PCT No.: PCT/EP2017/077147
§ 371 (c)(1),
(2) Date: Apr. 24, 2019

(87) PCT Pub. No.: WO2018/082969
PCT Pub. Date: May 11, 2018

(65) Prior Publication Data
US 2019/0276568 A1 Sep. 12, 2019

(30) Foreign Application Priority Data

Nov. 2, 2016 (WO) ................ PCT/CN2016/104390

(51) Int. Cl.
| | | |
|---|---|---|
| C08F 120/06 | (2006.01) | |
| C09C 3/10 | (2006.01) | |
| C08F 2/20 | (2006.01) | |
| C08F 2/38 | (2006.01) | |
| C08F 8/44 | (2006.01) | |
| C08K 3/22 | (2006.01) | |
| C08K 3/26 | (2006.01) | |
| C08K 3/32 | (2006.01) | |
| C08F 2/10 | (2006.01) | |
| B01F 17/00 | (2006.01) | |
| C09C 3/04 | (2006.01) | |

(52) U.S. Cl.
CPC .......... *C08F 120/06* (2013.01); *B01F 17/005* (2013.01); *C08F 2/10* (2013.01); *C08F 2/20* (2013.01); *C08F 2/38* (2013.01); *C08F 8/44* (2013.01); *C08K 3/22* (2013.01); *C08K 3/26* (2013.01); *C08K 3/32* (2013.01); *C09C 3/041* (2013.01); *C09C 3/10* (2013.01); *C08F 2500/02* (2013.01); *C08F 2500/03* (2013.01); *C08K 2003/2206* (2013.01); *C08K 2003/2227* (2013.01); *C08K 2003/2241* (2013.01); *C08K 2003/2244* (2013.01); *C08K 2003/262* (2013.01); *C08K 2003/265* (2013.01)

(58) Field of Classification Search
CPC ......... C08F 2/10; C08F 120/06; C08F 220/06
See application file for complete search history.

(56) References Cited

U.S. PATENT DOCUMENTS

| | | | |
|---|---|---|---|
| 4,840,985 A | 6/1989 | Gonnet et al. | |
| 5,297,740 A | 3/1994 | Landscheidt et al. | |
| 5,432,238 A | 7/1995 | Egraz et al. | |
| 5,432,239 A | 7/1995 | Egraz et al. | |
| 7,956,211 B2 | 6/2011 | Suau et al. | |
| 2006/0287423 A1 | 12/2006 | Michl et al. | |
| 2007/0106042 A1 | 5/2007 | Suau et al. | |
| 2007/0179262 A1* | 8/2007 | Suau | C08F 2/38 526/217 |
| 2010/0216962 A1 | 8/2010 | Guerret et al. | |
| 2012/0157596 A1* | 6/2012 | da Silva | C08F 2/38 524/425 |
| 2014/0256872 A1* | 9/2014 | Fujiwara | C08F 120/06 524/556 |
| 2017/0349681 A1* | 12/2017 | Suau | C08F 2/10 |
| 2019/0300657 A1* | 10/2019 | El-Toufaili | C08F 6/008 |

FOREIGN PATENT DOCUMENTS

| | | |
|---|---|---|
| AU | 2012213403 A1 | 8/2013 |
| AU | 2012213482 A1 | 8/2013 |
| DE | 4004953 A1 | 8/1991 |
| DE | 10311617 A1 | 9/2004 |
| EP | 1074293 A1 | 2/2001 |
| WO | WO-2012/104304 A1 | 8/2012 |
| WO | WO-2012/104401 A1 | 8/2012 |
| WO | WO 2016/066916 * 5/2016 |  |

OTHER PUBLICATIONS

International Search Report for PCT Patent Application No. PCT/EP2017/077147, dated Jan. 4, 2018.

* cited by examiner

*Primary Examiner* — Marc S Zimmer
(74) *Attorney, Agent, or Firm* — Marshall, Gerstein & Borun LLP

(57) ABSTRACT

An acrylic acid polymer having a weight average molecular weight $M_w$ in the range from 3500 to 2000 g/mol and a polydispersity index $M_w/M_n \leq 2.5$, wherein 30% to 60% of the acid groups of the acrylic acid polymers have been neutralized with calcium ions, 30% to 70% of the acrylic acid polymers have been neutralized with sodium ions and 0% to 10% of the acid groups of the acrylic acid polymers have not been neutralized.

9 Claims, No Drawings

ACRYLIC ACID POLYMERS NEUTRALIZED WITH SODIUM AND CALCIUM IONS AND HAVING A NARROW MOLECULAR WEIGHT DISTRIBUTION

CROSS-REFERENCE TO RELATED APPLICATIONS

This application is the U.S. National Stage application of International Patent Application No. PCT/EP2017/077147, filed Oct. 24, 2017, which claims the benefit of PCT Patent Application No. PCT/CN2016/104390, filed Nov. 2, 2016.

The invention relates to acrylic acid polymers neutralized with sodium and calcium ions and having a narrow molecular weight distribution, to a process for preparing the acrylic acid polymers and to the use thereof as dispersant in aqueous suspensions of solids.

Aqueous calcium carbonate suspensions are typically prepared by wet grinding of calcium carbonate using polycarboxylates as grinding auxiliary. Such calcium carbonate suspensions are used as fillers and white pigments in papermaking and in the dye industry. For good performance properties, high fineness of the ground pigment is necessary, and this should be achieved within a minimum grinding time. In order to assure broad industrial use, the suspensions, also called slurries, need to have both good pumpability and storage stability with a simultaneously high solids content. Storage stability is important since there are often storage and transport periods of several days to weeks between the grinding operation and further processing, and the suspensions have to remain pumpable within this period of time.

It is known that low molecular weight polyacrylic acids prepared by free-radical polymerization have good dispersing properties. For good efficacy, the mean molecular weight ($M_w$) of these polymers should be <50 000 g/mol. Polyacrylic acids with $M_w$<20 000 g/mol are often particularly effective.

DE 40 04 953 A1 describes a process for preparing acrylic acid polymers, in which a portion of the acrylic acid is neutralized with calcium hydroxide prior to performance of the polymerization. DE 103 11 617 A1 describes the use of polyacrylic acids having a mean molecular weight of 5000 to 30 000 g/mol and sulfur-containing organic end groups which have been at least partly neutralized with an alkali metal hydroxide or ammonia as grinding auxiliaries for calcium carbonate.

U.S. Pat. No. 4,840,985 describes partly neutralized acrylic acid polymers as grinding auxiliary for preparation of aqueous mineral suspensions which are used as pigment suspensions. 40% to 80% of the acid groups of the acrylic acid polymers have been neutralized with alkali metal ions, ammonium ions or polyvalent cations.

U.S. Pat. Nos. 5,432,238 and 5,432,239 describe polymers and copolymers of acrylic acid which have been neutralized with magnesium ions and sodium ions as grinding and dispersing auxiliary for preparation of mineral suspensions. According to U.S. Pat. No. 5,432,238, for this purpose, a polymer fraction obtained by fractionation and having a specific viscosity of 0.3 to 0.8 and a weight-average molecular weight of 1000-10 000 g/mol is used.

U.S. Pat. No. 7,956,211 discloses the preparation of polyacrylic acids having a low polydispersity index (PDI) using sulfur-containing organic molecular weight regulators by RAFT polymerization. The products can be used as grinding aids for aqueous mineral suspensions.

EP-A 1 074 293 discloses phosphonate-terminated polyacrylic acid having a molecular weight $M_w$ of 2000 to 5800 g/mol as a dispersant for production of aqueous slurries of calcium carbonate, kaolin, clay, talc and metal oxides having a solids content of at least 60 wt %.

WO 2012/104401 describes a process for preparing aqueous solutions of acrylic acid polymers by polymerization of acrylic acid in feed mode with peroxodisulfate as initiator in the presence of hypophosphite in water as solvent, in which water and optionally one or more ethylenically unsaturated comonomers are initially charged, and acrylic acid in acidic, unneutralized form, optionally one or more ethylenically unsaturated comonomers, an aqueous peroxodisulfate solution and an aqueous hypophosphite solution are added continuously, wherein the comonomer content does not exceed 30 wt %, based on the total monomer content. It is a characteristic feature of the acrylic acid polymers obtained that at least 76% of the total phosphorus content is in the form of phosphinate groups bonded within the polymer chain.

WO 2012/104304 describes a process for preparing aqueous solutions of acrylic acid polymers by polymerization of acrylic acid in feed operation with a free-radical initiator in the presence of hypophosphite in water as solvent, which process comprises (i) initially charging water and optionally one or more ethylenically unsaturated comonomers, (ii) continuously adding acrylic acid in acidic, unneutralized form, optionally one or more ethylenically unsaturated comonomers, aqueous free-radical initiator solution and aqueous hypophosphite solution, (iii) adding a base to the aqueous solution after termination of the acrylic acid feed, wherein the comonomer content does not exceed 30 wt %, based on the total monomer content, wherein the aqueous hypophosphite solution is added during a total feed time made up of three consecutive feed time spans $\Delta t_I$, $\Delta t_{II}$ and $\Delta t_{III}$, wherein the average feed rate in the second feed time span $\Delta t_{II}$ is greater than the average feed rates in the first and third feed time spans $\Delta t_I$, $\Delta t_{III}$.

The aqueous solutions obtained according to WO 2012/104401 and WO 2012/104304 and the acrylic acid polymers obtained therefrom are used as dispersants in aqueous solids dispersions of $CaCO_3$, kaolin, talc, $TiO_2$, ZnO, $ZrO_2$, $Al_2O_3$ or MgO.

In spite of the use of polymers, the storage stability of the suspensions is still limited. After only a few days and particularly after 1 to 2 weeks, there is such a significant rise in viscosity that the suspensions can be pumped and processed further only with great difficulty, if at all. At the same time, the suspensions can separate as a result of settling of the solids and form a sediment. A longer period of storage stability would distinctly simplify the logistics associated with the mineral suspensions.

The problem addressed is that of providing a dispersing and grinding auxiliary for preparation of mineral suspensions, especially calcium carbonate suspensions, which gives low-viscosity, storage-stable suspensions that are still pumpable even after a storage time of several weeks.

The problem was solved by acrylic acid polymers having a weight average molecular weight $M_w$ in the range from 3500 to 12 000 g/mol and a polydispersity index $M_w/M_n \leq 2.5$, wherein 30% to 60% of the acid groups of the acrylic acid polymers have been neutralized with calcium ions, 30% to 70% of the acrylic acid polymers have been neutralized with sodium ions and 0% to 10% of the acid groups of the acrylic acid polymers have not been neutralized.

Preferably, 40% to 60% of the acid groups of the acrylic acid polymers have been neutralized with calcium ions, 40% to 60% of the acid groups of the acrylic acid polymers have been neutralized with sodium ions and 0% to 10% of the acid groups of the acrylic acid polymers have not been neutralized. Preferably, the polydispersity index $M_w/M_n$ is ≤2.3, more preferably from 1.5 to 2.2. The acid groups of the acrylic acid polymers include the acid groups introduced into the polymer by acrylic acid and those introduced by any acidic comonomers used as well.

It has been found that, surprisingly, using acrylic acid polymers having a weight average molecular weight of 3500 to 12,000 g/mol and a narrow molecular weight distribution in which 30% to 60% of the acid groups have been neutralized with calcium ions, 30% to 70% of the acid groups have been neutralized with sodium ions and not more than 10% of the acid groups have not been neutralized as dispersant, calcium carbonate suspensions which still have a low viscosity and very good pumpability even after a storage time of three weeks are obtained.

The acrylic acid polymers of the invention are obtained by free-radical polymerization of acrylic acid, optionally with comonomers. It is possible to work by any known free-radical polymerization method for preparation of polyacrylic acids. Preference is given to solution polymerization in water, in an organic solvent or in a mixture of water and an organic solvent. Particular preference is given to polymerization in water. Acrylic acid polymers having a narrow molecular weight distribution can be obtained by fractionation of the acrylic acid polymers obtained, for example by sedimentation. The acrylic acid polymers neutralized in accordance with the invention are obtained by adding a base comprising sodium ions and a base comprising calcium ions to the solution of the unneutralized acrylic acid polymers prepared by free-radical polymerization of acrylic acid in acidic form in such amounts that 30% to 60% of the acid groups have been neutralized with calcium ions, 30% to 70% of the acid groups have been neutralized with sodium ions and not more than 10% of the acid groups have not been neutralized.

In general, aqueous solutions of acrylic acid polymers having a narrow molecular weight distribution are obtained by polymerization of acrylic acid in feed mode with a free-radical initiator in the presence of a chain transfer agent in water as solvent.

The present application also provides a process for preparing aqueous solutions of acrylic acid polymers having a weight average molecular weight $M_w$ in the range from 3500 to 12 000 g/mol and a polydispersity index $M_w/M_n$≤2.5, wherein 30% to 60% of the acid groups of the acrylic acid polymers have been neutralized with calcium ions, 30% to 70% of the acrylic acid polymers have been neutralized with sodium ions and 0% to 10% of the acid groups of the acrylic acid polymers have not been neutralized, by polymerization of acrylic acid in feed mode with a free radical initiator in the presence of a chain transfer agent in water as solvent, which process comprises (i) initially charging water and optionally acrylic acid in acidic, unneutralized form, optionally one or more ethylenically unsaturated comonomers, optionally the chain transfer agent and optionally initiator, (ii) adding acrylic acid, optionally one or more ethylenically unsaturated comonomers, aqueous free-radical initiator solution and chain transfer agent, (iii) adding bases to the aqueous solution after termination of the acrylic acid feed, wherein, in step (iii), a base comprising sodium ions and a base comprising calcium ions are added in such amounts that 30% to 60% of the acid groups of the acrylic acid polymers are neutralized with calcium ions, 30% to 70% of the acrylic acid polymers are neutralized with sodium ions and 0% to 10% of the acid groups of the acrylic acid polymers are not neutralized.

Preferably, in step (iii), first the base comprising calcium ions and then the base comprising sodium ions is added.

Preferred bases comprising sodium ions are sodium hydroxide and sodium carbonate. Particular preference is given to sodium hydroxide.

Preferred bases comprising calcium ions are calcium hydroxide and calcium carbonate. Particular preference is given to calcium hydroxide. Calcium hydroxide is preferably used in the form of "milk of lime", an aqueous calcium hydroxide suspension having a solids content of, for example, 20 wt %.

Suitable polymerization initiators are known initiators, for example inorganic or organic per compounds, such as peroxodisulfates, peroxides, hydroperoxides and peresters, azo compounds such as 2,2'-azobisisobutyronitrile, and redox systems with organic and inorganic components. Preferred initiators are peroxodisulfate and hydrogen peroxide.

Chain transfer agents used in the preparation of the acrylic acid polymers are sulfur-containing and phosphorus-containing chain transfer agents. Preference is given to mercaptoethanol, bisulfite and hypophosphite. A particularly preferred chain transfer agent is hypophosphite.

Hypophosphite can be used in the form of hypophosphorous acid or in the form of salts of hypophosphorous acid. Preference is given to a polymerization in feed mode which enables minimization of the residual content of the chain transfer agent in the polymer solution. Suitable feed methods are described in WO 2012/104401 and WO 2012/104304.

In a feed method, a total amount m1 of acrylic acid is added at a constant or varying metering rate over a period (t1-t1.0), a total amount m2 of free-radical initiator solution over a period (t2-t2.0) and a total amount m3 of chain transfer agent solution over a period (t3-t3.0) to a hot initial tank charge comprising a solvent, typically water. The polymerization takes place in the stirred tank within the period of time (t4-t4.0), with t1.0, t2.0 and t3.0 determining the start of the respective feed and t4.0 the commencement of the polymerization. The time t1 is the end of the metered addition of acrylic acid, t2 is the end of the metered addition of initiator, t3 is the end of the metered addition of chain transfer agent and t4 is the end of the polymerization including the postpolymerization that takes place from t1 to t4.

Aqueous solutions of acrylic acid polymers with very narrow molecular weight distribution can be obtained by polymerization of acrylic acid in feed mode with a free-radical initiator in the presence of hypophosphite in water as solvent, which comprises (i) initially charging water and optionally acrylic acid in acidic, unneutralized form, optionally one or more ethylenically unsaturated comonomers, optionally aqueous hypophosphite solution and optionally initiator, (ii) adding acrylic acid, optionally one or more ethylenically unsaturated comonomers, aqueous free-radical initiator solution and aqueous hypophosphite solution, (iii) adding a base to the aqueous solution after termination of the acrylic acid feed, wherein the comonomer content does not exceed 30 wt % based on the total monomer content, wherein the acrylic acid, the aqueous free-radical initiator solution and the aqueous hypophosphite solution are added such that the molar ratio x of acrylic acid to free-radically abstractable, phosphorus-bound hydrogen [AA]/[P—H] over a period of time in which at least 75% of the acrylic acid is converted has a value x which is constant to within ±0.5 and is in the range from 0.8 to 2.

The molar ratio x of acrylic acid to free-radically abstractable, phosphorus-bound hydrogen [AA]/[P—H] over a period of time in which at least 75% of the acrylic acid is converted is thus, in accordance with the invention, not less than 0.8±0.5 (i.e. can vary from 0.3 to 1.1 over this period of time) and not more than 2.0±0.5 (i.e. can vary from 1.5 to 2.5 over this period of time). In a preferred embodiment of the invention, the molar ratio x of acrylic acid to free-radically abstractable, phosphorus-bound hydrogen [AA]/[P—H] is 1.5±0.5. Free-radically abstractable, phosphorus-bound hydrogen is understood to mean covalent hydrogen-phosphorus bonds present in the sodium hypophosphite used or in the hypophosphite bonded terminally to the polymer chain. Sodium hypophosphite and incorporated hypophosphite may be present in water in dissociated form, without sodium as a counterion, and in protonated form.

In general, a total amount m1 of acrylic acid is added continuously with a constant or varying metering rate or discontinuously (batchwise) to an initial charge comprising water as solvent over a period of time (t1-t1.0), a total amount m2 of free-radical initiated solution over a period of time (t2-t2.0), and a total amount m3 of aqueous hypophosphite solution over a period of time (t3-t3.0). The polymerization takes place in the stirred reaction vessel within the period of time (t4-t4.0), with the time t4.0 determining the commencement of the polymerization. The time t1 determines the end of the acrylic acid addition, t2 determines the end of the initiator addition, t3 determines the end of the chain transfer agent addition and t4 determines the end of the polymerization reaction including the postpolymerization in the period of time from t1 to t4.

The residual amount of chain transfer agent m3' does not have a covalent bond to the polymer (C—P bond) and is therefore referred to hereinafter as inorganic phosphorus. It may be present in the form of the chain transfer agent used or in other oxidation states of hypophosphite, for example phosphonic acid, phosphoric acid. Also possible are the dissociated, protonated and structurally isomerized forms of the respective oxidation states. The amount of inorganic phosphorus m3' and the proportion m3'/m3 decrease with decreasing feed time chosen for the hypophosphite chain transfer agent t3-t3.0. The amount of inorganic phosphorus m3' likewise decreases with increasing proportion of hypophosphite chain transfer agent added early within the total chain transfer agent metering time t3-t3.0. There is also a decrease in m3' as the total amount of chain transfer agent m3 metered in the formulation is reduced. A suitable measure for the juncture of metered addition of the chain transfer agent averaged over time is the following parameter:

$$\bar{t}_{dosing} = \frac{1}{m3}\int_{t3,0}^{t3}(d(t)*t)dt$$

where t is the time from t3.0 to t3, d(t) is the rate of metered addition (unit mass/time) of the chain transfer agent at the juncture t. The juncture of metered addition averaged over time describes the addition of the total amount of chain transfer agent as an average over time.

In a preferred embodiment of the invention, all feeds commence at the same time t0, i.e. t1.0=t2.0=t3.0=t0. In this specific case, the ratio of the juncture of metered addition averaged over time for the chain transfer agent to the total metering time for the acrylic acid (t1-t1.0) is <0.49, more preferably <0.47 and especially 0.3 to 0.47. In addition, the ratio of the average juncture of metered addition for the chain transfer agent to the total metering time of the chain transfer agent is preferably <0.5, more preferably ≤0.45 and especially from 0.3 to 0.45.

The feeding of the hypophosphite chain transfer agent can be effected continuously or discontinuously in discrete amounts m31, m32, m33 etc. at discrete times t31, t32, t33 etc. until time t3.

It has been found that the molecular weight distribution is conserved in spite of the reduction in the amount of inorganic phosphorus (m3') when the molar ratio of the concentrations of free-radically abstractable phosphorus-bound hydrogen and acrylic acid [AA]/[P—H] present at any moment in the reaction vessel is kept constant in the range from (0.8 to 2.0)±0.5, preferably 1.5±0.5, over a period of time in which at least 75% of the monomer conversion is effected, by controlling the process parameters. A decrease in the conversion range during which the ratio of acrylic acid to phosphorus-bound hydrogen is kept constant leads to broadening of the molecular weight distribution. The deviation from the preferred value [AA]/[P—H]=1.5±0.5 should be at a minimum, even outside the limits of a monomer conversion of at least 75%, in order to obtain a very narrow molecular weight distribution. The value of [AA]/[P—H] outside the conversion range of 75% should always be less than [AA]/[P—H]=4.5.

The concentrations of acrylic acid present can be determined by HPLC, NMR spectroscopy or GC. The concentration of the P—H functionalities present can be determined by 31-P {1H} NMR spectroscopy.

In general, the total feed time for the acrylic acid in the feed methods is generally 80 to 500 min, preferably 100 to 400 min.

The comonomers can be initially charged in the reaction mixture, initially charged in part and added in part as a feed, or added exclusively as a feed. When said comonomers are added in part or in full as a feed, they are generally added simultaneously with the acrylic acid.

Water is generally added and heated to the reaction temperature of at least 75° C., preferably 90° C. to 115° C., more preferably 95° C. to 105° C. In addition, it is possible to include an aqueous solution of phosphorous acid as corrosion inhibitor in the initial charge. The continuous feeds of acrylic acid, and optionally of ethylenically unsaturated comonomer, initiator and chain transfer agent, are then started. Acrylic acid is added in unneutralized, acidic form. The feeds are generally started simultaneously. Both peroxodisulfate as initiator and hypophosphite as chain transfer agent are used in the form of their aqueous solutions. Particular preference is given to using hypophosphite in the form of hypophosphorous acid or of the sodium salt. Hypophosphite is preferably used in amounts of 3 to 14 wt %, preferably 4 to 10 wt %, more preferably 5 to 8 wt %, based on the total amount of monomers.

A preferred free-radical initiator is peroxodisulfate. Peroxodisulfate is generally used in the form of the sodium, potassium or ammonium salt. Peroxodisulfate is preferably used in amounts of 0.5 to 10 wt %, preferably 0.8 to 5 wt %, based on the total amount of monomers (acrylic acid and optionally comonomers). It is additionally possible to use hydrogen peroxide as free-radical initiator, for example in the form of a 50% aqueous solution. Also suitable are redox initiators based on peroxides and hydroperoxides and reducing compounds, for example hydrogen peroxide in the presence of iron(II) sulfate and/or sodium hydroxymethanesulfinate.

The duration of the initiator feed is frequently up to 50% longer than the duration of the acrylic acid feed. The duration of the initiator feed is preferably about 3 to 20% longer than the duration of the acrylic acid feed. The total duration of the chain transfer agent feed is preferably equal to the duration of the acrylic acid feed. In general, the total duration of the chain transfer agent feed is of equal duration of the acrylic acid feed to up to 50% shorter or longer than the duration of the acrylic acid feed.

The acrylic acid polymer may comprise up to 30 wt %, preferably up to 20%, more preferably up to 10 wt %, based on all ethylenically unsaturated monomers, of copolymerized ethylenically unsaturated comonomers. Examples of suitable ethylenically unsaturated comonomers are methacrylic acid, maleic acid, maleic anhydride, vinylsulfonic acid, allylsulfonic acid and 2-acrylamido-2-methylpropanesulfonic acid (AMPS) and salts thereof. Mixtures of these comonomers may also be present.

The duration of the monomer feed or—when a comonomer is used—of the monomer feeds is, for example, 2 to 5 h. For example, when all feeds start simultaneously, the chain transfer agent feed ends 10 to 30 min before the end of the monomer feed and the initiator feed ends 10 to 30 min after the end of the monomer feed.

Particular preference is given to acrylic acid homopolymers with no comonomer content. The molecular weight of the acrylic acid polymers is, in accordance with the invention, from 3500 to 12 000 g/mol, preferably from 3500 to 12 000 g/mol and more preferably from 3500 to 8000 g/mol, more preferably 3500 to 6500 g/mol and especially 4000 to 6500 g/mol. The molecular weight can be controlled within these ranges via the amount of chain transfer agent used.

According to the invention, the polydispersity index (PDI) of the acrylic acid polymers $M_w/M_n$ is ≤2.5, preferably ≤2.3, more preferably from 1.5 to 2.2, for example 2.1.

Finally, a base comprising sodium ions and a base comprising calcium ions are added to the acidic acrylic acid polymers obtained in such amounts that 30% to 60% of the acid groups of the acrylic acid polymers are neutralized with calcium ions, 30% to 70% of the acrylic acid polymers are neutralized with sodium ions and 0% to 10% of the acid groups of the acrylic acid polymers are not neutralized.

The acidic acrylic acid polymers are preferably neutralized with calcium hydroxide and sodium hydroxide. The neutralization may commence with the addition of the base comprising calcium ions or of the base comprising sodium ions. Preference is given to commencing with the addition of the base comprising calcium ions.

Calcium hydroxide is preferably used in the form of milk of lime, i.e. an aqueous calcium hydroxide suspension having a solids content of, for example, 20 wt %, and sodium hydroxide in the form of an aqueous solution having a solids content of, for example, 50 wt %.

For neutralization, the calculated amount of the aqueous calcium hydroxide suspension is pumped into the aqueous solution of the acidic acrylic acid polymers in a coolable stirred tank while stirring. This is done while cooling, in order to absorb the heat of neutralization that arises. In a second step, the calculated amount of a 50% sodium hydroxide solution is pumped into the solution of the acrylic acid polymers. This is also done while cooling, in order to absorb the heat of neutralization that arises. Stirring is continued until the evolution of heat has abated and a clear solution has formed. Subsequently, the desired final concentration is established with water.

Aqueous acrylic acid polymer solutions having a solids content of 30 to 60 wt % are obtained. Preference is given to solids contents of 35 to 50 wt %. These can be used to obtain the solid neutralized acrylic acid polymers by spray drying or spray granulation.

The present invention also relates to the use of the acrylic acid polymers as dispersant and grinding auxiliary in aqueous solids dispersions, especially to use in aqueous dispersions of $CaCO_3$, kaolin, talc, $TiO_2$, ZnO, $ZrO_2$, $Al_2O_3$ or MgO.

The slurries obtained therefrom are used as white pigments for graphic papers and paints, as deflocculants for the production of ceramic construction materials or else as filler for thermoplastics.

Particularly preferred dispersions (slurries) for which the acrylic acid polymers of the invention are used are ground calcium carbonate slurries. The grinding is conducted continuously or batchwise in an aqueous suspension and preferably takes place in a ball mill. The calcium carbonate content of these suspensions is generally ≥50 wt %, preferably ≥60 wt % and more preferably ≥70 wt %. Typically, based in each case on the calcium carbonate present in the suspension, 0.1 to 2 wt %, preferably 0.3 to 1.5 wt %, of the acrylic acid polymers of the invention are used. Preferably, in these calcium carbonate slurries after grinding, 90% to 95% of the particles have a particle size of less than 2 μm, and 70% to 75% of the particles a particle size of less than 1 μm. The calcium carbonate suspensions obtained have excellent rheological properties and still have very good pumpability even after storage for several weeks.

The invention is illustrated in detail by the examples which follow.

EXAMPLES

Examples 1 to 8 and Comparative Examples C1 to C5

The polymers used in the examples are polyacrylic acids which have been prepared by the feed method in water as solvent from acrylic acid with sodium persulfate as initiator and sodium hypophosphite as chain transfer agent. Subsequently, the acidic polyacrylates have been neutralized or partly neutralized with calcium hydroxide, magnesium hydroxide and/or sodium hydroxide.

The neutralization is conducted in a coolable stirred tank. For this purpose, first the calculated amount of about 20% calcium hydroxide suspension or of a magnesium hydroxide suspension and then the calculated amount of about 50% sodium hydroxide solution is pumped into the aqueous acidic polyacrylic acid solution present in the stirred tank. The mixture is cooled during the operation in order to remove the heat of neutralization released. The cooling is continued until the evolution of heat has abated and a clear solution has formed. To establish the desired final concentration, water is added.

The acrylic acid polymers of the invention were first neutralized with calcium hydroxide and then with sodium hydroxide.

The neutralization level of the polyacrylic acids was determined by means of titration.

The molecular weight and the number average $M_n$ and the weight average $M_w$ of the molecular weight distribution of the polymers were determined by means of gel permeation chromatography (GPC). The molecular weight distribution was determined by means of GPC on aqueous solutions of the acrylic acid polymers buffered to pH 7 using hydroxyethyl methacrylate copolymer network (HEMA) as stationary phase against sodium polyacrylate standards. The (partly) neutralized acrylic acid polymers prepared and used in the examples are shown in table 1.

TABLE 1

| Polymer | Molecular weight (g/mol) | PDI ($M_w/M_n$) | Active content (wt %) | Solids content (wt %) | Counterion (equivalent %) | | | |
|---|---|---|---|---|---|---|---|---|
| | | | | | Ca | Na | Mg | H |
| 1 | 5000 | 3.2 | 42.0 | 45 | — | 96 | — | 4 |
| 2 | 5000 | 2.1 | 41.9 | 45 | — | 97 | — | 3 |
| 3 | 5000 | 2.2 | 47.1 | 45 | — | 55 | — | 45 |
| 4 | 5000 | 2.1 | 36.7 | 39 | — | 60 | 40 | — |
| 5 | 5000 | 2.1 | 38.1 | 40 | — | 37 | 60 | 3 |
| 6 | 5000 | 2.8 | 37.4 | 40 | 60 | 35 | — | 5 |
| 7 | 5000 | 2.0 | 36.1 | 39 | 60 | 37 | — | 3 |
| 8 | 5000 | 2.0 | 33.8 | 37 | 60 | 40 | — | 0 |
| 9 | 5000 | 2.1 | 36.2 | 39 | 40 | 58 | — | 2 |
| 10 | 5000 | 2.8 | 37.4 | 41 | — | 56 | 40 | 4 |
| 11 | 5000 | 2.8 | 37.5 | 39 | — | 36 | 60 | 4 |
| 12 | 5000 | 3.2 | 48 | 45 | — | 55 | — | 45 |
| 13 | 5000 | 2.1 | 36.8 | 39 | 50 | 46 | — | 4 |
| 14 | 5000 | 2.8 | 33.3 | 35 | 40 | 56 | — | 4 |

The polyacrylate solutions were tested for their suitability as dispersants for production of slurries. For this purpose, grinding of calcium carbonate (Marple Flour, Imerys) was conducted in each case in a Dispermat. For this purpose, 300 g of calcium carbonate and 600 g of ceramic beads in each case were mixed and initially charged in 1 L jacketed tank. Subsequently, 100 g of a dilute aqueous solution of the polyacrylate to be tested were added. Grinding was effected using a grinding assembly of the Dispermat AE04-C1 type (from Getzmann GmbH) with a cross-beam stirrer at a speed of 1300 rpm. As soon as 73% of the pigment had a particle size (PSD) of less than 1 μm (Malvern Mastersizer 3000), the grinding was ended (after about 60 min). After the grinding, the slurry was filtered through a 780 μm filter with the aid of a porcelain suction funnel for removal of the ceramic beads, and the solids content of the slurry was adjusted to 77%. The viscosity of the slurry was measured after one day, one week, two weeks and three weeks.

The starting weight of the polymer is reported in wt % of active dispersant based on solid calcium carbonate (wt/wt %). The results are shown in table 2.

TABLE 2

| Example | Polymer | Amount of dispersant (wt/wt %) | Dynamic viscosity of the $CaCO_3$ slurry (mPas) | | | |
|---|---|---|---|---|---|---|
| | | | 1 day | 7 days | 14 days | 21 days |
| C1 | 1 | 0.8 | 1055 | 2169 | 2706 | not measurable |
| C2 | 2 | 0.8 | 787 | 1677 | 2453 | not measurable |
| C3 | 3 | 0.8 | 271 | 317 | 353 | 401 |
| C4 | 4 | 0.8 | 277 | 355 | 337 | 364 |
| C5 | 6 | 0.8 | 237 | 259 | 275 | 315 |
| 1 | 7 | 0.8 | 213 | 216 | 227 | 242 |
| 2 | 8 | 0.8 | 198 | 223 | 240 | 256 |
| 3 | 9 | 0.8 | 230 | 239 | 242 | 251 |
| C6 | 10 | 0.8 | 419 | 570 | 604 | 614 |
| C7 | 11 | 0.8 | 280 | 365 | 443 | 517 |
| C8 | 12 | 0.8 | 345 | 524 | 694 | 518 |
| 4 | 7 | 0.7 | 331 | 329 | 439 | 518 |
| 5 | 7 | 0.6 | 558 | 834 | 1098 | 1448 |
| 6 | 7 | 1.0 | 208 | 211 | 215 | 232 |
| 7 | 13 | 0.8 | 227 | 241 | 246 | 262 |
| C9 | 14 | 0.8 | 308 | 474 | 479 | 509 |
| 8 | 7 | 1.0 | 218 | 221 | 232 | 261 |

The viscosity of the calcium carbonate slurries produced with the acrylic acid polymers of the invention is significantly lower than the viscosity of the calcium carbonate slurries produced with the comparative polymers with the same amount of dispersant over the entire period of three weeks.

Example 9 and Comparative Examples C10, C11

In the course of storage, the alkaline calcium carbonate dispersions absorb carbon dioxide from the air. Carbon dioxide reacts with dissolved calcium carbonate to give calcium hydrogencarbonate, which lowers the pH of the dispersion and leads to an increase in viscosity. In order to simulate the effect of the dispersants on the viscosity of a calcium carbonate dispersion on absorption of $CO_2$, different amounts of sodium hydrogencarbonate were added to the slurries stabilized with various polyacrylates. Immediately after the addition, the viscosity of the slurries was measured. Sodium hydrogencarbonate was added as a 10% by weight solution; the amount is reported in the table as wt % of solid $NaHCO_3$ based on solid calcium carbonate in the slurry. The slurries were each stabilized with 0.8% (wt/wt %) of polyacrylate. The results are shown in table 3.

TABLE 3

| Polymer | Viscosity before addition | Viscosity after addition of 0.25 wt/wt % of $NaHCO_3$ | Viscosity after addition of 0.50 wt/wt % of $NaHCO_3$ | Viscosity after addition of 0.90 wt/wt % of $NaHCO_3$ |
|---|---|---|---|---|
| 3 | 271 | 330 | 595 | 1050 |
| 7 | 213 | 188 | 237 | 474 |
| 5 | 237 | 219 | 423 | 671 |

Inventive polymer 7 and comparative polymers 3 and 5 had a narrow molecular weight distribution (PDI=2.1). The smallest rise in viscosity after addition of the $NaHCO_3$ solution was exhibited by the calcium carbonate slurry which was stabilized with the polyacrylate neutralized with calcium and sodium ions (polymer 7).

Polyacrylates neutralized with calcium and sodium ions thus stabilize calcium carbonate slurries better against the aging of the slurries as a result of absorption of $CO_2$ than polyacrylates neutralized with sodium ions only (polymer 3) or neutralized with sodium and magnesium ions (polymer 5).

The invention claimed is:

1. A process for preparing aqueous solutions of acrylic acid polymers comprising polymerizing acrylic acid in feed mode with a free-radical initiator in the presence of a chain transfer agent in water as solvent, which process comprises
    (i) initially charging water and optionally acrylic acid in acidic, unneutralized form, optionally one or more ethylenically unsaturated comonomer, optionally the chain transfer agent, and optionally initiator,
(ii) adding acrylic acid, optionally one or more ethylenically unsaturated comonomers, aqueous free-radical initiator solution, and chain transfer agent,
(iii) adding a base to the aqueous solution after termination of the acrylic acid feed,
wherein, in step (iii), a base comprising sodium ions and a base comprising calcium ions are added in such amounts that 30% to 60% of the acid groups of the acrylic acid polymers are neutralized with calcium ions, 30% to 70% of the acrylic acid polymers are neutralized with sodium ions and 0% to 10% of the acid groups of the acrylic acid polymers are not neutralized, and
wherein the chain transfer agent is hypophosphite.

2. The process according to claim 1, wherein, in step (iii), first the base comprising calcium ions and then the base comprising sodium ions is added.

3. The process according to claim 1, wherein the base comprising sodium ions is selected from the group consisting of sodium hydroxide and sodium carbonate.

4. The process according to claim 1, wherein the base comprising calcium ions is selected from the group consisting of calcium hydroxide and calcium carbonate.

5. An acrylic acid polymer obtained from the process according to claim 1.

6. A method of dispersing and grinding an aqueous dispersion of solids comprising adding a polymer according to claim 5 to the aqueous dispersion.

7. The method of claim 6 wherein the aqueous dispersion is $CaCO_3$, kaolin, talc, $TiO_2$, ZnO, $ZrO_2$, $Al_2O_3$, or MgO.

8. A dispersant and grinding auxiliary for aqueous dispersions of solids comprising an acrylic acid polymer according to claim 5.

9. The dispersant and grinding auxiliary of claim 8 wherein the aqueous dispersions are dispersions of $CaCO_3$, kaolin, talc, $TiO_2$, ZnO, $ZrO_2$, $Al_2O_3$, or MgO.

* * * * *